United States Patent
Paramasivam et al.

(10) Patent No.: US 11,605,847 B2
(45) Date of Patent: Mar. 14, 2023

(54) THERMAL EXCHANGE PLATE ASSEMBLY FOR VEHICLE BATTERY

(71) Applicant: FORD GLOBAL TECHNOLOGIES, LLC, Dearborn, MI (US)

(72) Inventors: Saravanan Paramasivam, South Lyon, MI (US); Kimberley King, Northville, MI (US); Rajaram Subramanian, Ann Arbor, MI (US); Edward Popyk, Dearborn, MI (US); Samir Subba, Dearborn, MI (US); Dave Moschet, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 840 days.

(21) Appl. No.: 15/343,277

(22) Filed: Nov. 4, 2016

(65) Prior Publication Data

US 2018/0131051 A1    May 10, 2018

(51) Int. Cl.
| | |
|---|---|
| *H01M 10/6556* | (2014.01) |
| *H01M 10/613* | (2014.01) |
| *H01M 10/617* | (2014.01) |
| *H01M 10/6568* | (2014.01) |
| *H01M 10/625* | (2014.01) |
| *F28F 9/02* | (2006.01) |
| *H01M 50/20* | (2021.01) |
| *F28D 9/00* | (2006.01) |

(52) U.S. Cl.
CPC .......... *H01M 10/625* (2015.04); *F28F 9/028* (2013.01); *F28F 9/0265* (2013.01); *H01M 10/613* (2015.04); *H01M 10/617* (2015.04); *H01M 10/6556* (2015.04); *H01M 10/6568* (2015.04); *H01M 50/20* (2021.01); *F28D 9/0031* (2013.01); *H01M 2220/20* (2013.01); *Y02E 60/10* (2013.01)

(58) Field of Classification Search
None
See application file for complete search history.

(56) References Cited

U.S. PATENT DOCUMENTS

| | | | |
|---|---|---|---|
| 5,841,634 A | 11/1998 | Visser | |
| 8,288,048 B2 | 10/2012 | Thompson | |
| 8,336,319 B2 | 12/2012 | Johnston et al. | |
| 9,620,829 B2 * | 4/2017 | Haussmann | H01M 10/625 |
| 2013/0160972 A1 * | 6/2013 | Sheppard | F28F 27/00 165/96 |
| 2014/0030560 A1 | 1/2014 | Lev et al. | |
| 2014/0295228 A1 | 10/2014 | Yan et al. | |
| 2014/0356652 A1 | 12/2014 | Boddakayala et al. | |

(Continued)

FOREIGN PATENT DOCUMENTS

| | | |
|---|---|---|
| CN | 103959508 A | 7/2014 |
| CN | 104321925 A | 1/2015 |

*Primary Examiner* — Barbara L Gilliam
(74) *Attorney, Agent, or Firm* — David B. Kelley; Carlson, Gaskey & Olds, P.C.

(57) ABSTRACT

A battery assembly according to a non-limiting aspect of the present disclosure includes, among other things, an array of battery cells, and a thermal exchange plate assembly adjacent the array. The thermal exchange plate assembly includes an inlet, an outlet, a main channel, and a bypass channel configured to direct fluid from the inlet to the outlet while substantially bypassing the main channel.

14 Claims, 9 Drawing Sheets

(56) References Cited

U.S. PATENT DOCUMENTS

2015/0200427 A1    7/2015  Haskins et al.
2016/0272036 A1*  9/2016  Chen ..................... B60K 11/04
2017/0324132 A1* 11/2017  Kenney ............... H01M 10/625

* cited by examiner

THERMAL EXCHANGE PLATE ASSEMBLY FOR VEHICLE BATTERY

BACKGROUND

This disclosure relates to a battery assembly for an electrified vehicle. The battery assembly has a thermal exchange plate assembly, which includes a main channel and a bypass channel.

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on an internal combustion engine to propel the vehicle.

A high voltage battery pack for powering electric machines and other electrical loads typically includes multiple battery cells. The battery cells give off heat during charging and discharging operations. It is often desirable to dissipate this heat from the battery pack to improve capacity and life of the battery cells.

SUMMARY

A battery assembly according to a non-limiting aspect of the present disclosure includes, among other things, an array of battery cells, and a thermal exchange plate assembly adjacent the array. The thermal exchange plate assembly includes an inlet, an outlet, a main channel, and a bypass channel configured to direct fluid from the inlet to the outlet while substantially bypassing the main channel.

In a further non-limiting embodiment of the foregoing battery assembly, the battery assembly includes a deflector configured to direct fluid into the bypass channel.

In a further non-limiting embodiment of any of the foregoing battery assemblies, the main channel includes a wall, a delivery side on a first side of the wall, a return side on a second side of the wall, and a turning section between the delivery side and the return side. Further, the deflector is configured to direct fluid from the first side of the wall to the second side of the wall.

In a further non-limiting embodiment of any of the foregoing battery assemblies, the deflector has a rim and a base defining a concave surface facing the inlet and outlet.

In a further non-limiting embodiment of any of the foregoing battery assemblies, a first end of the rim is aligned with a longitudinal axis of the inlet, and a second end of the rim is aligned with a longitudinal axis of the outlet.

In a further non-limiting embodiment of any of the foregoing battery assemblies, a length of the deflector is substantially perpendicular to the longitudinal axes of the inlet and outlet.

In a further non-limiting embodiment of any of the foregoing battery assemblies, the rim defines a stadium shape.

In a further non-limiting embodiment of any of the foregoing battery assemblies, the deflector includes a plurality of openings in the base on the second side of the wall.

In a further non-limiting embodiment of any of the foregoing battery assemblies, a first end of the deflector is adjacent the inlet, and a second end of the deflector does not extend beyond the wall.

In a further non-limiting embodiment of any of the foregoing battery assemblies, the bypass channel is defined within a bypass plenum.

In a further non-limiting embodiment of any of the foregoing battery assemblies, the battery assembly includes a first deflector configured to deflect fluid from the inlet into the bypass channel, and a second deflector configured to deflect fluid from the bypass channel to the outlet.

In a further non-limiting embodiment of any of the foregoing battery assemblies, an angular position of the first and second deflectors is adjustable.

In a further non-limiting embodiment of any of the foregoing battery assemblies, a position of the deflector is adjustable in a direction parallel to a length of the deflector.

Another battery assembly according to a non-limiting embodiment of the present disclosure includes, among other things, a first thermal exchange plate assembly including an inlet, an outlet, a main channel, and a bypass channel configured to direct fluid to the outlet of the first thermal exchange plate assembly while substantially bypassing the main channel. The battery assembly further includes a second thermal exchange plate assembly including an inlet fluidly coupled to the outlet of the first thermal exchange plate assembly.

In a further non-limiting embodiment of the foregoing battery assembly, the first thermal exchange plate further comprises a deflector configured to direct fluid into the bypass channel.

In a further non-limiting embodiment of any of the foregoing battery assemblies, the main channel includes a wall, a delivery side on a first side of the wall, a return side on a second side of the wall, and a turning section between the delivery side and the return side. Further, the deflector is configured to direct fluid from the first side of the wall to the second side of the wall.

In a further non-limiting embodiment of any of the foregoing battery assemblies, the deflector has a rim and a base defining a generally concave surface facing the inlet and outlet of the first thermal exchange plate assembly.

In a further non-limiting embodiment of any of the foregoing battery assemblies, the deflector includes a plurality of openings in the base on the second side of the wall.

In a further non-limiting embodiment of any of the foregoing battery assemblies, a first end of the deflector is adjacent the inlet of the first thermal exchange plate assembly, and a second end of the deflector does not extend beyond the wall.

In a further non-limiting embodiment of any of the foregoing battery assemblies, a position of the deflector is adjustable in a direction parallel to a length of the deflector.

BRIEF DESCRIPTION OF THE DRAWINGS

FIG. 3 is a perspective view of an example thermal exchange plate assembly including a first example deflector. In FIG. 3, a cover plate of the thermal exchange plate assembly has been removed for purposes of illustrating the interior of the thermal exchange plate assembly.

FIG. 5 is a perspective view of an example thermal exchange plate assembly including a second example deflector. In FIG. 5, like FIG. 3, a cover plate of the thermal exchange plate assembly has been removed.

FIG. 6 is a perspective view of an example thermal exchange plate assembly including a third example deflector. In FIG. 6, like FIGS. 3 and 5, a cover plate of the thermal exchange plate assembly has been removed.

In FIG. 7, the cover plate of the thermal exchange plate assembly has been removed.

DETAILED DESCRIPTION

This disclosure relates to an assembly for an electrified vehicle. The assembly may be a battery assembly that includes a thermal exchange plate assembly for thermally managing heat generated by battery cells of the battery assembly. In one example, the thermal exchange plate assembly includes an inlet port, an outlet port, a main channel, and a bypass channel. The bypass channel is configured to direct fluid from the inlet port to the outlet port while substantially bypassing the main channel. Such an arrangement allows multiple thermal exchange plate assemblies to be connected to a fluid source in series, while maintaining temperature gradients similar to that of a parallel arrangement. These and other features are discussed in greater detail in the following paragraphs of this detailed description.

Figure 1:
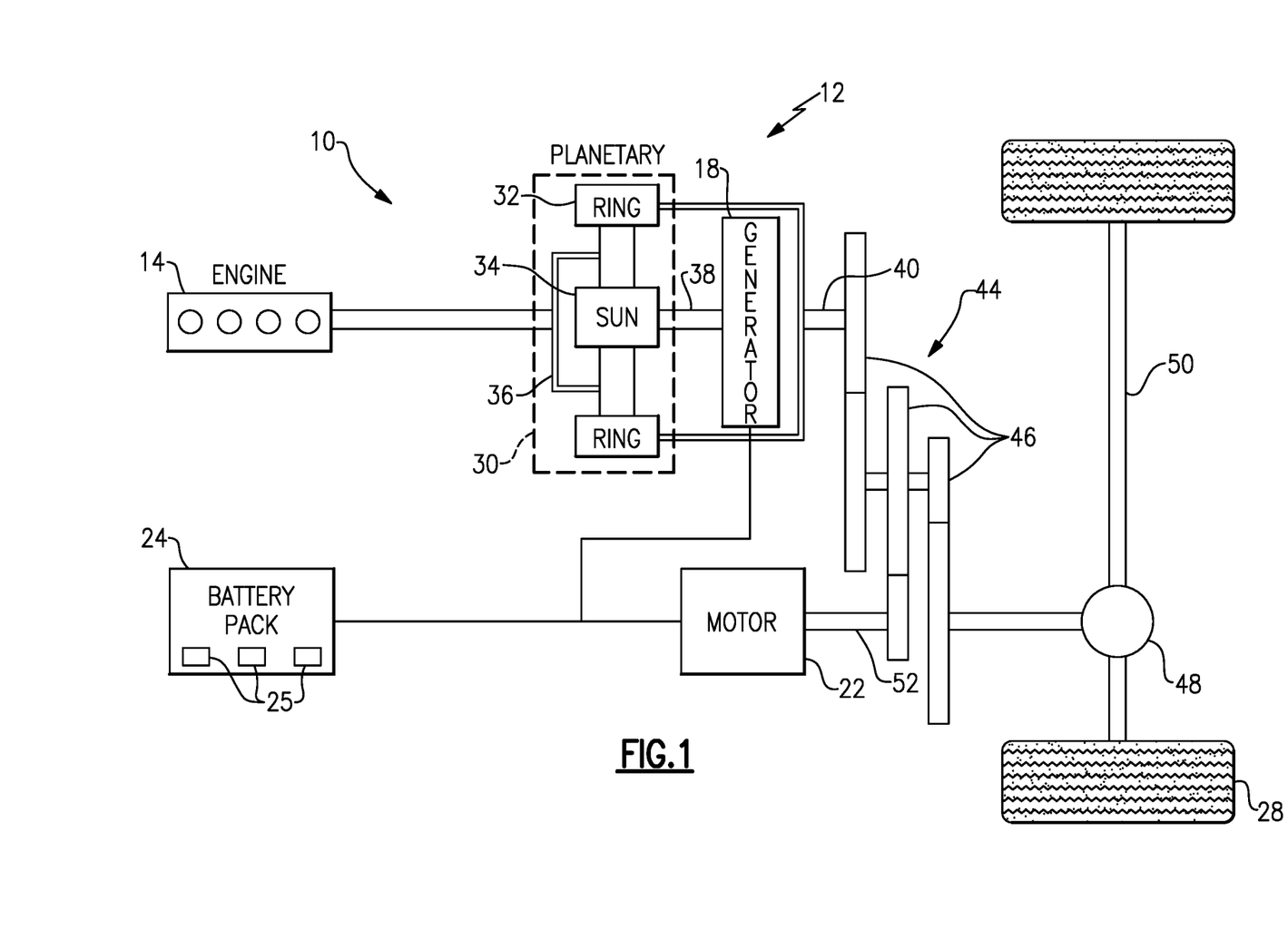
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's) and battery electric vehicles (BEV's).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an exemplary electrified vehicle battery. The battery assembly 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2:
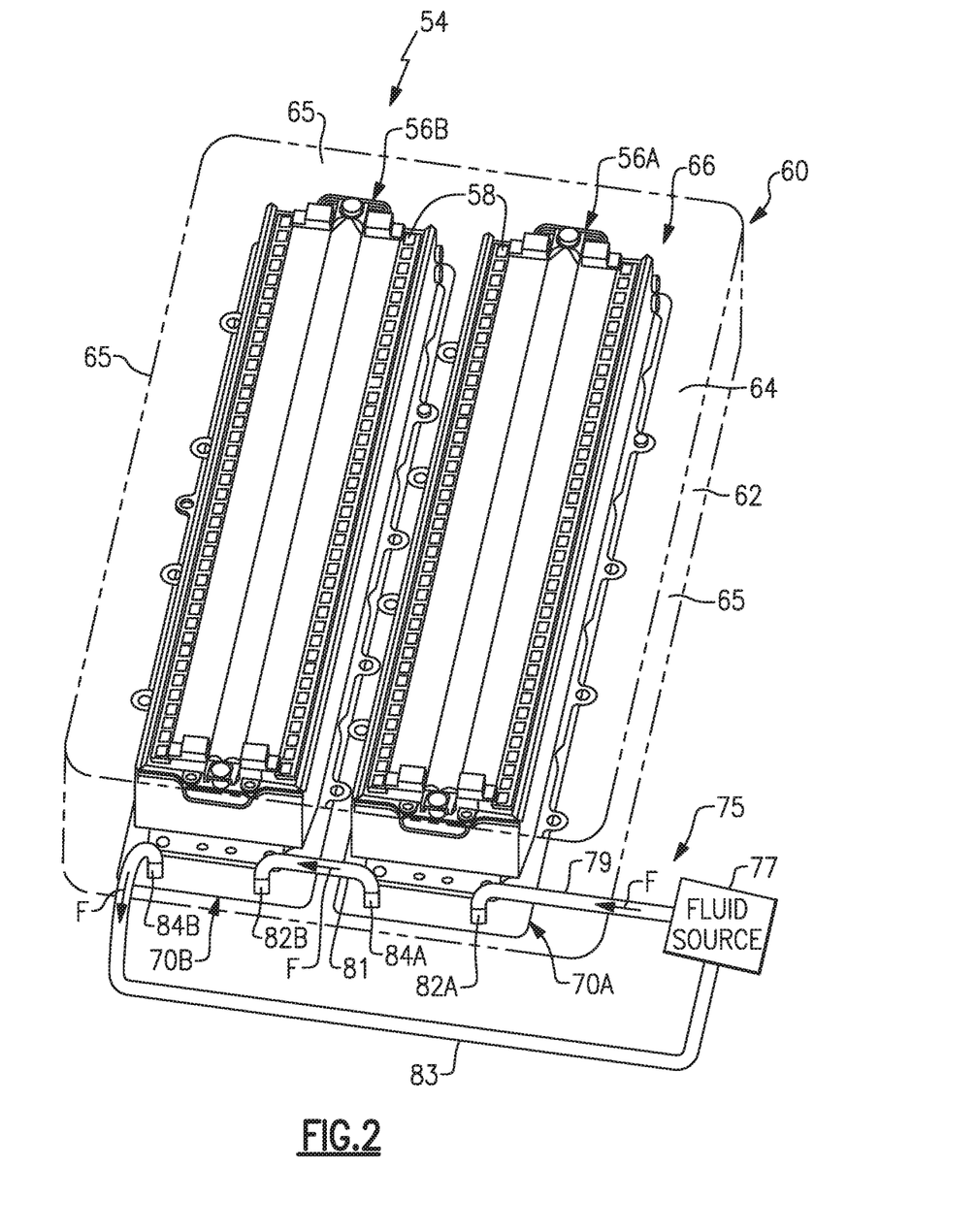
FIG. 2 schematically illustrates a battery pack of an electrified vehicle.

FIG. 2 illustrates a battery assembly 54 that can be incorporated into an electrified vehicle. For example, the battery assembly 54 could be employed within the electrified vehicle 12 of FIG. 1. The battery assembly 54 includes battery arrays, which can be described as groupings of battery cells, for supplying electrical power to various vehicle components. In this example there are two battery arrays 56A, 56B. Although two battery arrays 56A, 56B are illustrated in FIG. 2, the battery assembly 54 could include a single battery array or multiple battery arrays. In other words, this disclosure is not limited to the specific configuration shown in FIG. 2.

Each battery array 56A, 56B includes a plurality of battery cells 58 that may be stacked side-by-side along a span length of each battery array 56A, 56B. Although not shown in the highly schematic depiction of FIG. 2, the battery cells 58 are electrically connected to one another using busbar assemblies. In one embodiment, the battery cells 58 are prismatic, lithium-ion cells. However, battery cells having other geometries (cylindrical, pouch, etc.) and/or other chemistries (nickel-metal hydride, lead-acid, etc.) could alternatively be utilized within the scope of this disclosure.

An enclosure assembly 60 (shown in phantom in FIG. 2) surrounds the battery arrays 56A, 56B. The enclosure assembly 60 defines an interior 66 for housing the battery arrays 56A, 56B and, potentially, any other components of the battery assembly 54. In one non-limiting embodiment, the enclosure assembly 60 includes a tray 62 and a cover 64 which establish a plurality of walls 65 that surround the interior 66. The enclosure assembly 60 may take any size, shape or configuration, and is not limited to the specific configuration of FIG. 2.

During some conditions, heat may be generated by the battery cells 58 of the battery arrays 56A, 56B during charging and discharging operations. Heat may also be transferred into the battery cells 58 during vehicle key-off conditions as a result of relatively hot ambient conditions. During other conditions, such as relatively cold ambient conditions, the battery cells 58 may need to be heated. A thermal management system 75 may therefore be utilized to thermally condition (i.e., heat or cool) the battery cells 58.

The thermal management system 75, for example, may include a fluid source 77 and at least one thermal exchange plate assembly. In some examples the thermal exchange plate assemblies may be referred to as cold plate assemblies. In the example of FIG. 2, the thermal management system 75 includes a first thermal exchange plate assembly 70A and a second thermal exchange plate assembly 70B. While this example illustrates two thermal exchange plate assemblies, this disclosure extends to thermal management systems including additional thermal exchange plate assemblies.

Each of the first and second thermal exchange plate assemblies 70A, 70B includes an inlet port 82A, 82B, and an outlet port 84A, 84B, respectively. In this disclosure, the inlet ports can be referred to as "inlets," and the outlet ports as "outlets." In this example, the first and second thermal exchange plate assemblies 70A, 70B are fluidly coupled to the fluid source 77 in series. As will be explained below, while the first and second thermal exchange plate assemblies 70A, 70B are connected in series, the thermal exchange plate assemblies 70A, 70B are capable of achieving temperature gradients as if the thermal exchange plate assemblies 70A, 70B were connected to the fluid source 77 in parallel, which provides effective heat transfer while reducing the overall size of the thermal management system 75.

Again, the first and second thermal exchange plate assemblies 70A, 70B are fluidly coupled to the fluid source 77 in series. In particular, the inlet port 82A of the first thermal exchange plate assembly 70A is directly coupled to the fluid source 77 by way of a first tubing section 79. The outlet port 84A of the first thermal exchange plate assembly 70A is directly coupled to the inlet port 82B of the second thermal exchange plate assembly 70B by way of a second tubing section 81. Finally, the outlet port 84B of the second thermal exchange plate assembly 70B is directly coupled to the fluid source 77 by way of a third tubing section 83.

The tubing sections 79, 81, 83 may include tubes, hoses, pipes or the like. A fluid F, such as glycol or some other suitable fluid, is communicated from the fluid source 77 to the first tubing section 79, through the first and second thermal exchange plate assemblies 70A, 70B, and is ultimately returned to the fluid source 77 via the third tubing section 83. While glycol is mentioned as one example, other coolants, including gases, are also contemplated within the scope of this disclosure. Further, the fluid F could be provided by a coolant mixture such as water mixed with ethylene glycol.

The first and second thermal exchange plate assemblies 70A, 70B are in contact with one or more surfaces of the battery cells 58 of a respective array. As fluid F is circulated through the first and second thermal exchange plate assemblies 70A, 70B, the fluid F either adds or removes heat to/from the battery assembly 54. In other words, the fluid F may enhance the heat transfer effect achieved by the thermal exchange plate assemblies 70A, 70B.

In one non-limiting embodiment, the battery arrays 56A, 56B of the battery assembly 54 are positioned atop a respective thermal exchange plate assembly 70A, 70B so that the thermal exchange plate assemblies 70A, 70B are in contact with a bottom surface of each battery cell 58. In one example, the thermal exchange plate assemblies 70A, 70B indirectly contact the bottom surface of each battery cell 58 by way of an intermediate layer of thermal insulating material. In another example, the thermal exchange plate assemblies 70A, 70B directly contact the battery cells 58.

Figure 3:
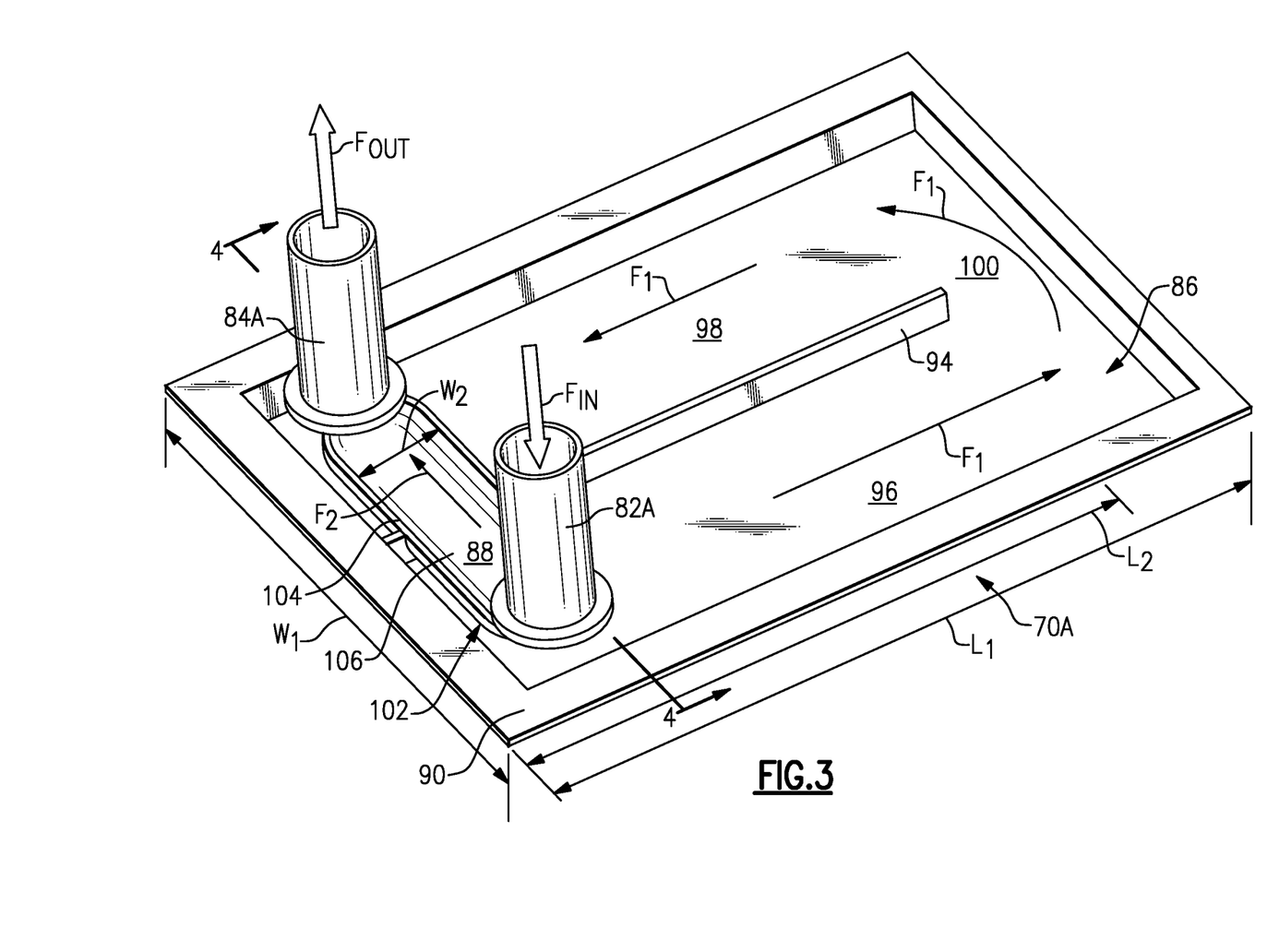

FIG. 3 is a perspective view illustrating the detail of an example first thermal exchange plate assembly 70A. In FIG. 3, a cover plate of the first thermal exchange plate 70A has been removed for purposes of illustrating the detail of the interior of the first thermal exchange plate 70A.

Figure 4:
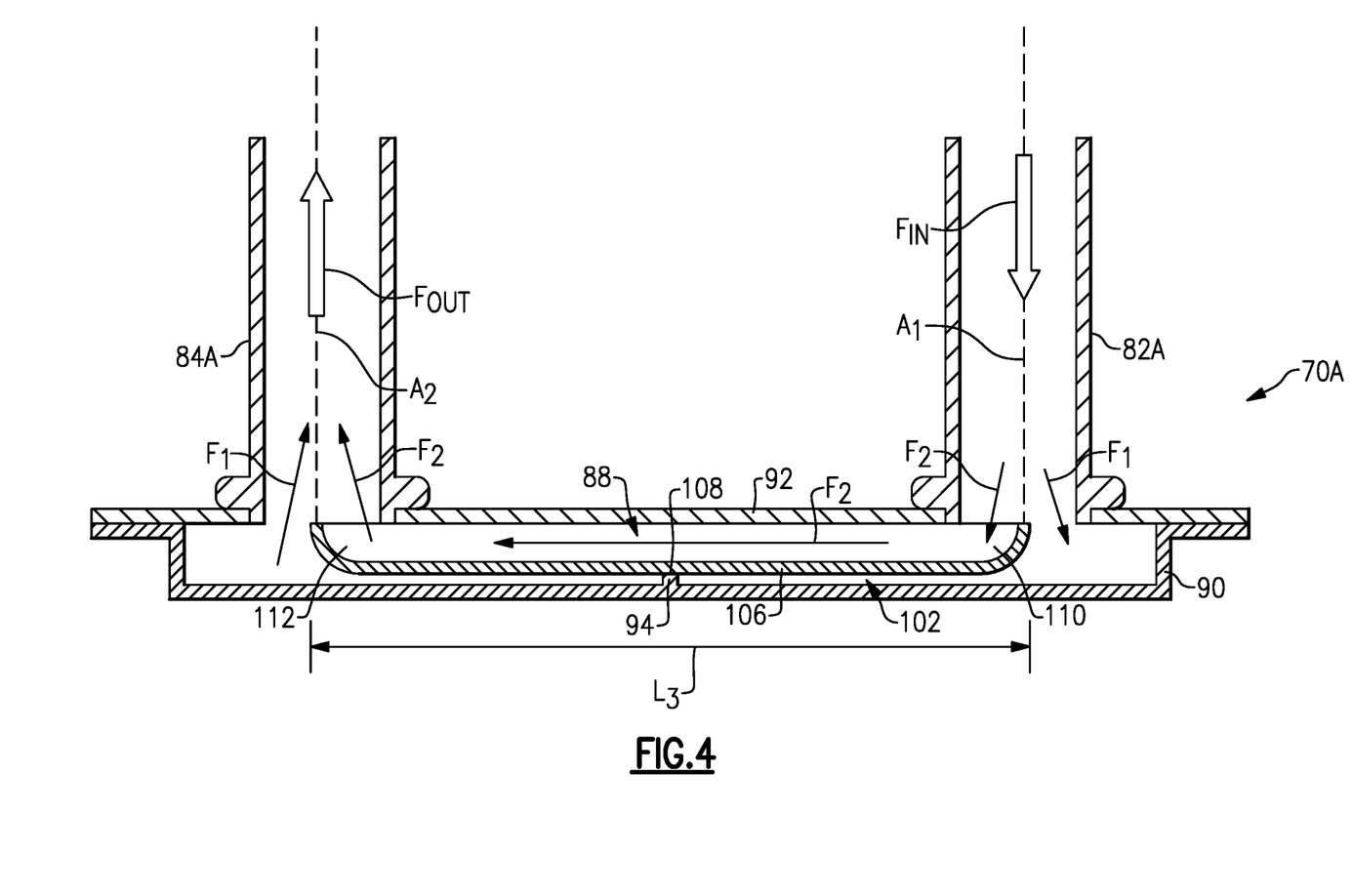
FIG. 4 is a cross-sectional view along line 4-4 from FIG. 3, and illustrates a bypass channel of the thermal exchange plate assembly.

The first thermal exchange plate 70A includes a main channel 86 and a bypass channel 88. The main channel 86 is defined, in this example, between a base plate 90 and a cover plate 92 (FIG. 4). The base plate 90 and cover plate 92 have a length L1 and a width W1 substantially corresponding to the length and width of the array 56A of battery cells 58. The base plate 90, in this example, includes a wall 94 extending into the main channel 86 by a length L2, which is shorter than the length $L_1$. The wall 94, in this example, partially divides the main channel 86 into a delivery side 96 and a return side 98. The main channel 86 also includes a turning section 100 at the end of the wall 94, which serves to turn fluid from the delivery side 96 and the return side 98.

While FIG. 3 illustrates one example cooling scheme for the main channel 86, this disclosure is not limited to the specific configuration shown in FIG. 3. The main channel could include additional walls that establish a different configuration. For example, the main channel 86 may establish a serpentine passage having multiple turns. Various coolant flow schemes come within the scope of this disclosure.

The bypass channel 88 is configured to direct fluid from the inlet port 82A to the outlet port 84A while substantially bypassing the main channel 86. In this way, a portion of the fluid entering the inlet port 82A is directed to the outlet port 84A and ultimately to the second thermal exchange plate assembly 70B without absorbing heat, for example, from the battery array 56A. In this way, the bypass channel 88 allows the thermal management system 75 to provide cooler, for example, fluid to the second thermal exchange plate assembly 70B despite the thermal exchange plate assemblies 70A, 70B being connected in series.

With joint reference to FIGS. 3 and 4, the bypass channel 88 is provided by a deflector 102 in one example. In this example, the deflector 102 has a rim 104 and a base 106 defining a generally concave surface facing the inlet and outlet ports 82A, 84A. The deflector 102 has a length $L_3$ and a width W2. The width W2 in one example substantially corresponds to a diameter of the inlet and outlet ports 82A, 84A. The length $L_3$ of the deflector substantially corresponds to the distance between the inlet and outlet ports 82A, 84A. In this example, when viewed from above, the rim 104 resembles the geometric "stadium" shape, although other shapes come within the scope of this disclosure.

In one example, the rim 104 of the deflector 102 is aligned, at one end, with a longitudinal axis $A_1$ of the inlet port 82A and, at an opposite end, is aligned with a longitudinal axis $A_2$ of the outlet port 84A. The wall 94 includes a notch 108 to allow the deflector 102 to pass from one side of the wall 94 to the other. The rim 104 of the deflector 102 contacts and is sealed against the cover plate 92 to provide the bypass channel 88 in this example.

In use, a flow of fluid $F_{IN}$ (which is illustrated in FIG. 2 as the fluid F) is directed to the inlet port 82A from the fluid source 77. The deflector 102 splits the flow of fluid $F_{IN}$ into a main flow $F_1$ and a bypass flow $F_2$. The main flow $F_1$ enters the main channel 86, and flows from the delivery side 96, around the wall 94 at the turning section 100, and to the return side 98. The main flow $F_1$ absorbs heat, for example from the battery array 56A. Ultimately, the main flow $F_1$ flows to the outlet port 84A where it is directed downstream to the second thermal exchange plate assembly 70B.

The deflector 102, in this example, directs the bypass flow $F_2$ from the inlet port 82A to the outlet port 84A. In this example, a first portion 110 of the deflector 102 is provided below (relative to the orientation of FIG. 4) the inlet port 82A. The first portion 110 provides an inlet to the bypass channel 88. Adjacent the first portion 110, the base 106 is curved to provide a smooth transition for the fluid $F_2$ entering the bypass channel. The first portion 110 is curved so as to turn the fluid $F_2$ from a direction substantially parallel to the axis $A_1$ to a direction substantially perpendicular to the axis $A_1$ within the bypass channel 88. The deflector also includes a second portion 112 adjacent the outlet port 84A. The second portion 112 is curved similar to the first portion 110, and is configured to turn the fluid $F_2$ from a direction perpendicular to the axis $A_2$ to a direction substantially parallel to the axis $A_2$.

The bypass flow $F_2$ is directed from the inlet port 82A to the outlet port 84A while substantially bypassing the main channel 86. That is, the primary function of the bypass flow $F_2$ is not transferring heat to or from the battery array 56A, but rather ensuring that the downstream thermal exchange plate assembly 70B is provided with relatively cool fluid, for example. In the example of FIGS. 3-4, the main and bypass flows $F_1$, $F_2$ mix in the outlet port 84A and are directed downstream to provide an outlet flow $F_{OUT}$ to the second thermal exchange plate assembly 70B. The outlet flow $F_{OUT}$ has a different temperature than $F_{IN}$, but the temperature change is not as significant as it would have been without the bypass flow $F_2$.

While only two thermal exchange plate assemblies 70A, 70B are illustrated in FIG. 2, it should be understood that the thermal management system 75 could include any number of additional thermal exchange plate assemblies. Further, it should be understood that the second thermal exchange plate assembly 70B may be arranged substantially identically to the first exchange plate assembly 70A. In another example, the second thermal exchange plate assembly 70B does not include a bypass channel because it is the last thermal exchange plate in the series. In examples where there are three or more thermal exchange plate assemblies, the last thermal exchange plate assembly in the series may not include a bypass channel.

Figure 5:
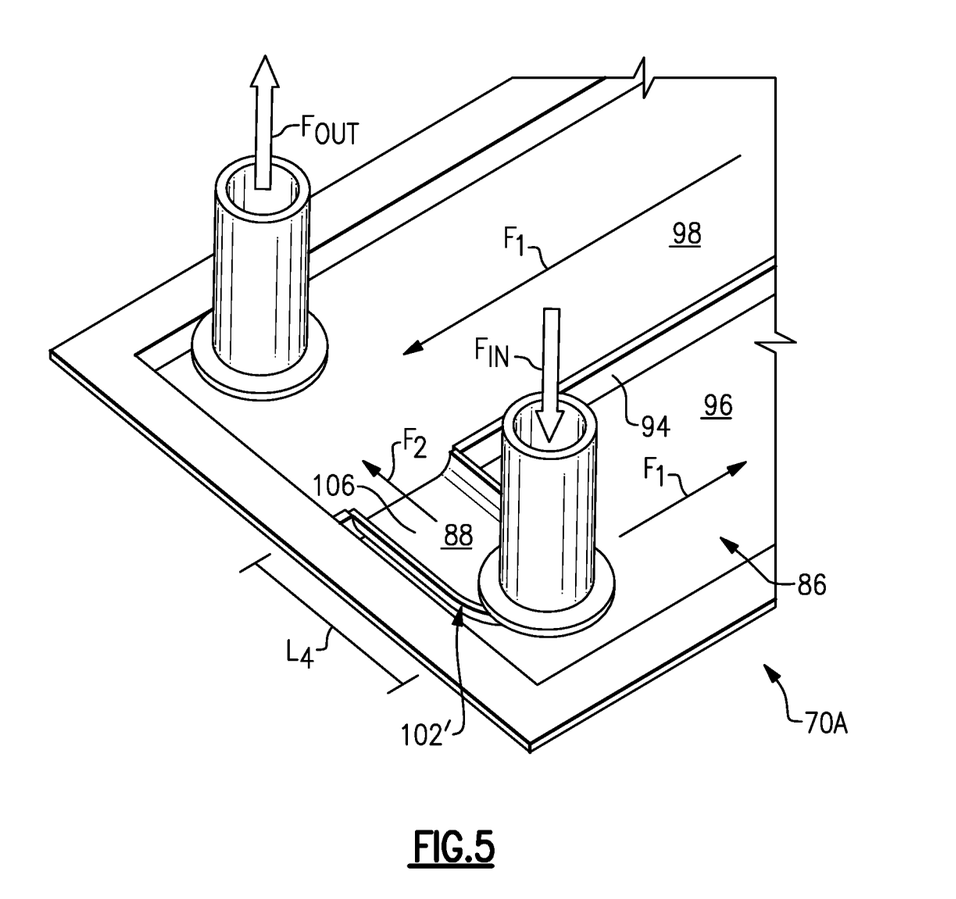

FIG. 5 is a perspective view of the first thermal exchange plate assembly 70A including another example deflector 102'. The deflector 102' in this example is similar to the deflector 102 of FIGS. 3-4, but has a length $L_4$ that does not extend beyond the wall 94. In this example, when viewed from above, the rim 104 resembles a half "stadium" shape. The deflector 102' is shaped similar to the deflector 102 adjacent the inlet port 82A (e.g., the deflector 102 at the first portion 110), but adjacent the wall 94 the deflector 102' is essentially open and allows fluid to enter into the return side 98 of the main channel 86. When the fluid $F_2$ is in the return side 98 of the main channel 86, the bypass flow $F_2$ intermixes with the main flow $F_1$, which may provide a more uniform level of heat transfer between the flows $F_1$, $F_2$ than, say, in the embodiment of FIGS. 3-4. This, in turn, provides a more uniform temperature in the outlet flow $F_{OUT}$.

Figure 6:
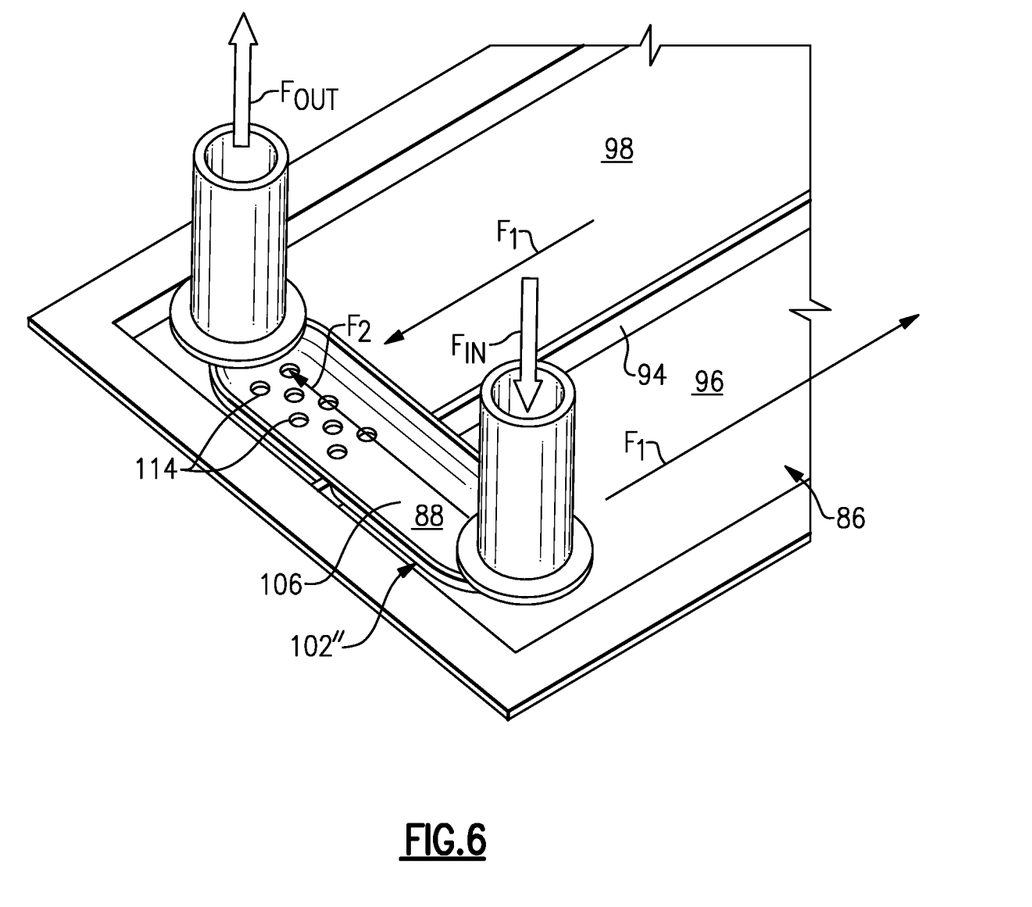

FIG. 6 is a perspective view of the first thermal exchange plate assembly 70A including yet another example deflector 102". In this example, the deflector 102" is shaped substantially the same as the deflector 102 in FIGS. 3-4, but in this example the deflector 102" includes a plurality of openings 114 in the base 106. The openings 114 in this example are provided in the deflector 102" only on the side of the wall 94 corresponding to the return side 98 of the main channel 86. The openings 114 allow some of the main flow $F_1$ to enter the bypass channel 88 and intermix with the bypass flow $F_2$. The embodiment of FIG. 6 provides intermixing (similar to the FIG. 5 embodiment) while also having a possible additional benefit of reducing turbulence (fluid resistance) that may, in some instances, be caused by the intermixing of the flows $F_1$, $F_2$ in the FIG. 5 embodiment.

The deflectors 102, 102', 102" of FIGS. 3-6 are, in one example, fixed relative to the wall 94. In other examples, however, the deflectors 102, 102', 102" may be moveable in a direction parallel to the length (e.g., $L_3$, $L_4$) of the deflectors 102, 102', 102". Movement may be in response to movement of an actuator or other mechanism. Movement of the deflectors 102, 102', 102" may allow selective adjustment of the amount of fluid entering the bypass channel 88, and may also allow adjustment in the amount of mixing the flows $F_1$, $F_2$ adjacent the outlet port 84A, for example. The selective adjustment may be made in response to a temperature of one or more of the battery arrays 56A, 56B or the fluid F. To this end, this disclosure could include sensors configured to provide signals indicative of the temperature of the battery arrays 56A, 56B or the fluid F.

Figure 7:
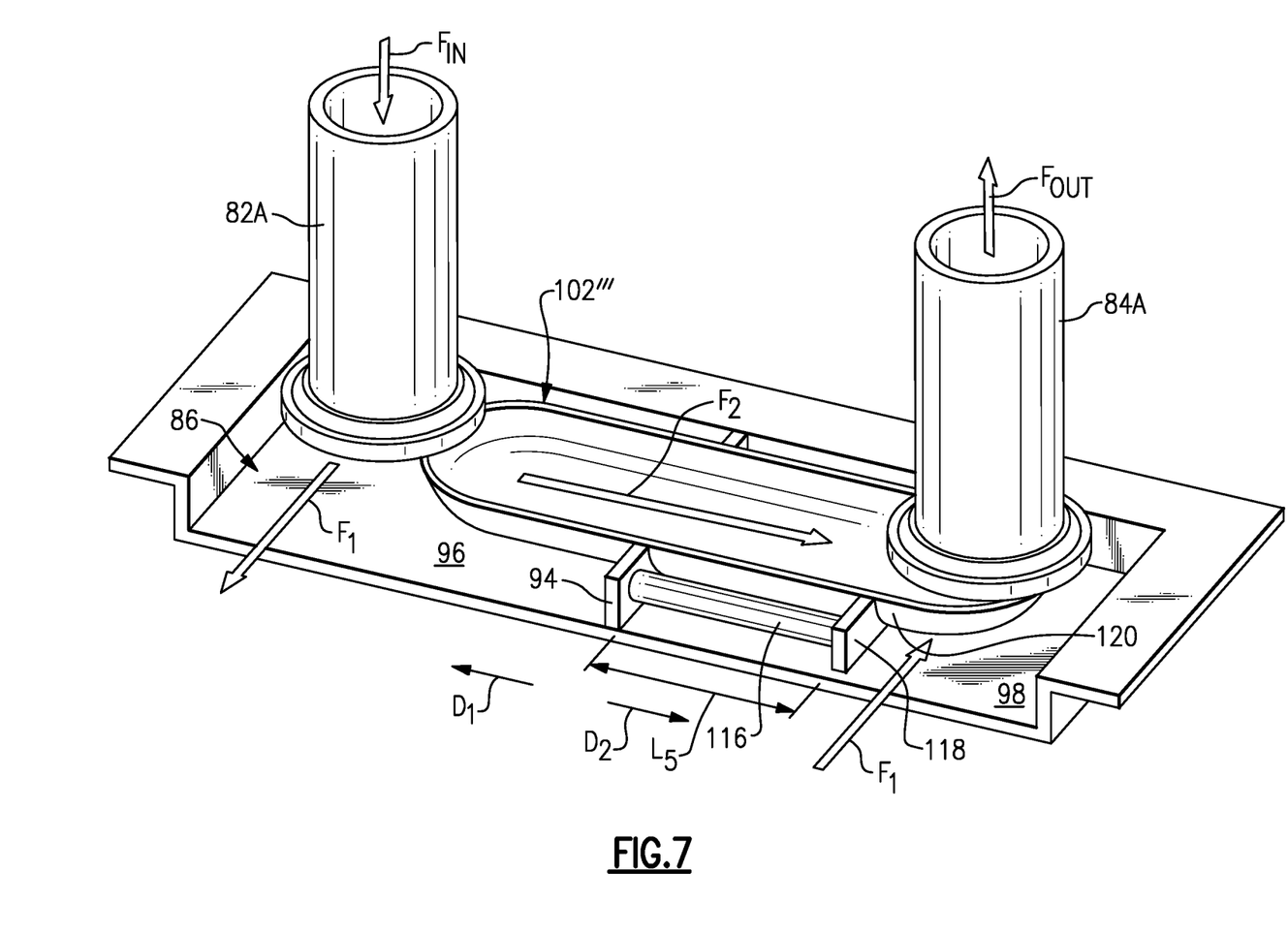
FIG. 7 is a cross-sectional, perspective view illustrating an example thermal exchange plate assembly including a fourth example deflector.
Figures 8, 9:
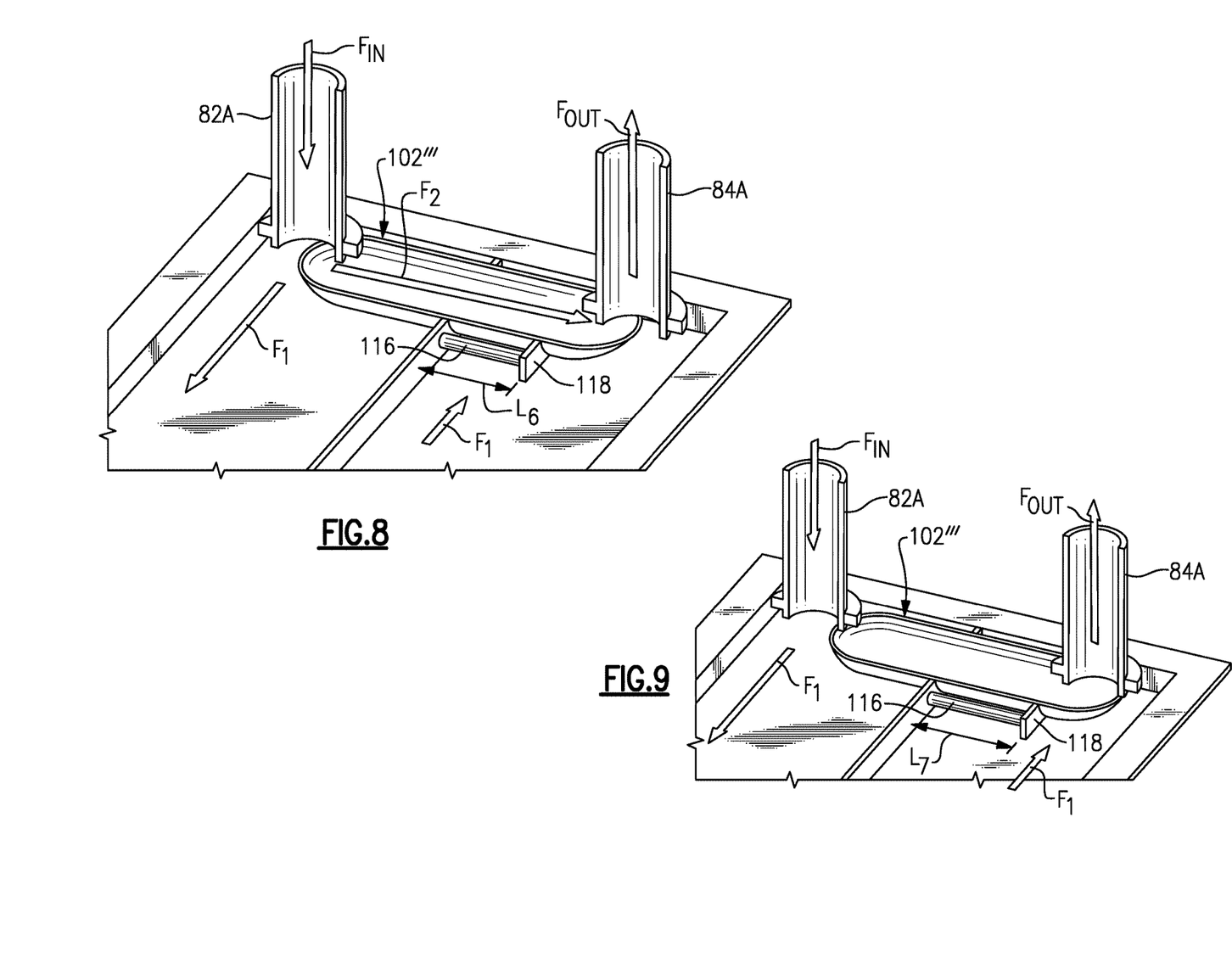
FIG. 8 is a cross-sectional, perspective view illustrating the example thermal exchange plate assembly of FIG. 7 with a thermally responsive attachment in a contracted state.
FIG. 9 is a cross-sectional, perspective view illustrating the example thermal exchange plate assembly of FIG. 7 with a thermally responsive attachment in an expanded state.

FIGS. 7-9 illustrate the thermal exchange plate assembly 70A including a thermally responsive attachment 116 configured to move the deflector 102''' in directions $D_1$, $D_2$, which are parallel to the length $L_3$ of the deflector 102'''. In this example, the thermally responsive attachment 116 is provided by a piece of material having a relatively high coefficient of thermal expansion. In general, the thermally responsive attachment 116 has a higher coefficient of thermal expansion than the materials used to make the remainder of the thermal exchange plate assembly 70A. In particular, the thermally responsive attachment 116 has a higher coefficient of linear thermal expansion than the remainder of the thermal exchange plate assembly 70A. Example materials for the thermally responsive attachment 116 include, among others, lithium and alloys containing lithium, zinc and zinc alloys, magnesium and magnesium alloys, and lead and lead alloys, for example. Other materials come within the scope of this disclosure.

In this example, the thermally responsive attachment 116 is provided by a cylindrical piece of material having a variable length $L_5$. The thermally responsive attachment 116 need not be cylindrical, however. The thermally responsive attachment 116 is capable of linearly expanding and contracting to change the length $L_5$. The thermally responsive attachment 116 is connected, at one end, to the wall 94 and to a tab 118 projecting from the deflector 102''' at the other end. The tab 118 projects from an external wall 120 of the deflector 102''' and projects toward the return side 98 of the main channel 86. In this example, the thermally responsive attachment 116 is provided in the return side 98 of the main channel 86 and is directly exposed to the flow $F_1$. The thermally responsive attachment 116 is rigidly connected to the wall 94 and the tab 118 in this example, and the deflector 102''' is slidable in the directions $D_1$, $D_2$ relative to the wall 94.

Figure 10:
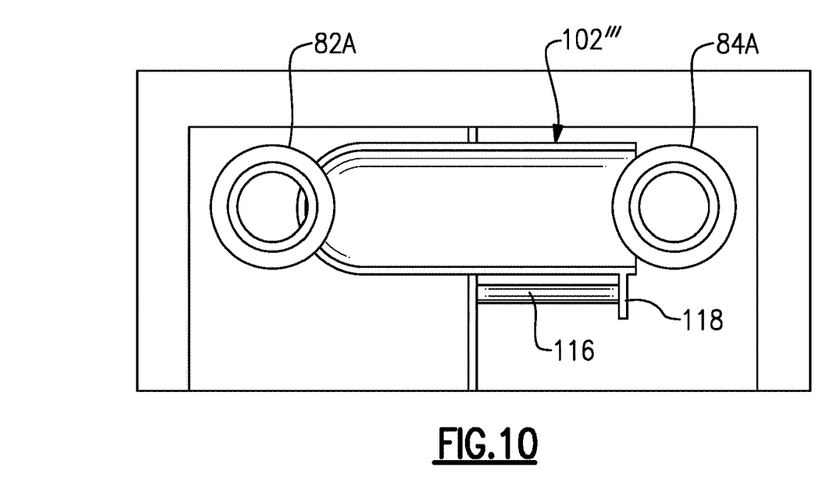
FIG. 10 is a top view illustrating the example exchange plate assembly of FIG. 7 but with a deflector that has been essentially cut off past a tab.

The deflector 102''' is substantially similar in structure to the deflector 102, for example, with the exception of the tab 118. The deflector 102''' could include holes 114, such as those illustrated in FIG. 6, or could be cut-off at a location past the tab 118, as illustrated in FIG. 10, for example, to intermix the flows $F_1$, $F_2$, as discussed above.

Depending on the temperature of the flow $F_1$, the thermally responsive attachment 116 expands and contracts. Expansion and contraction slides the deflector 102' in the directions $D_1$, $D_2$. As the temperature of the flow $F_1$ decreases, the thermally responsive attachment 116 contracts, which moves the deflector 102' in the direction $D_1$ toward the inlet port 82A, as illustrated in FIG. 8. In FIG. 8, the thermally responsive attachment 116 is in a contracted state and has a length $L_6$. In FIG. 8, the deflector 102''' is positioned below the inlet port 82A substantially as shown in FIG. 4, such that the deflector 102' splits the flow of fluid $F_{IN}$ into the flows $F_1$, $F_2$. In FIG. 8, the deflector 102''' is positioned such that about 50% of $F_{IN}$ becomes bypass flow $F_2$.

When the main flow F1, as experienced by the thermally responsive attachment 116, is relatively cool, this is indicative of a condition where the battery array 56A is being adequately cooled (for example) by the main flow F1. Thus, a relatively large amount of bypass flow F2 can substantially bypass the main channel 86 without impeding the ability of the thermal exchange plate assembly 70A to cool the battery array 56A. Again, one example of such a condition is illustrated in FIG. 8, and corresponds to about 50% of FIN becoming bypass flow F2.

When the main flow $F_1$, as experienced by the thermally responsive attachment 116, is relatively warm, however, this is indicative of a condition where the battery array 56A is not being adequately cooled (for example) by the main flow $F_1$, and that an increase in the main flow $F_1$ would be beneficial. Thus, as the temperature of the main flow $F_1$ increases, the thermally responsive attachment 116 expands, which moves the deflector 102''' in the direction $D_2$ toward the outlet port 84A, as illustrated in FIG. 9. In FIG. 9, the thermally responsive attachment 116 is in an expanded state and has a length $L_7$, which is greater than the length $L_6$. Such linear expansion of the thermally responsive attachment 116 moves the deflector 102''' such that less fluid $F_{IN}$ becomes bypass flow $F_2$. Thus, the main flow $F_1$ is increased, which provides more effective cooling to the array 56A. In one example, the deflector 102''' has moved to a position where 0% of the fluid $F_{IN}$ becomes bypass flow $F_2$.

It should be understood that while examples of 50% and 0% are mentioned relative to FIGS. 8 and 9 respectively, that the deflector 102''' could be positioned at any number of intermediate positions between 0% and 50% by corresponding expansion and contraction of the thermally responsive attachment 116. Further, it should be understood that greater than 50% of $F_{IN}$ could become bypass flow $F_2$.

Accordingly, the thermally responsive attachment 116 self-regulates the amount of bypass flow $F_2$ based on the cooling needs of the array 56A, and does so in a passive manner by relying on material properties and their reaction to changes in fluid temperature as opposed to a selectively operated actuator or control mechanism, for example.

Figure 11:
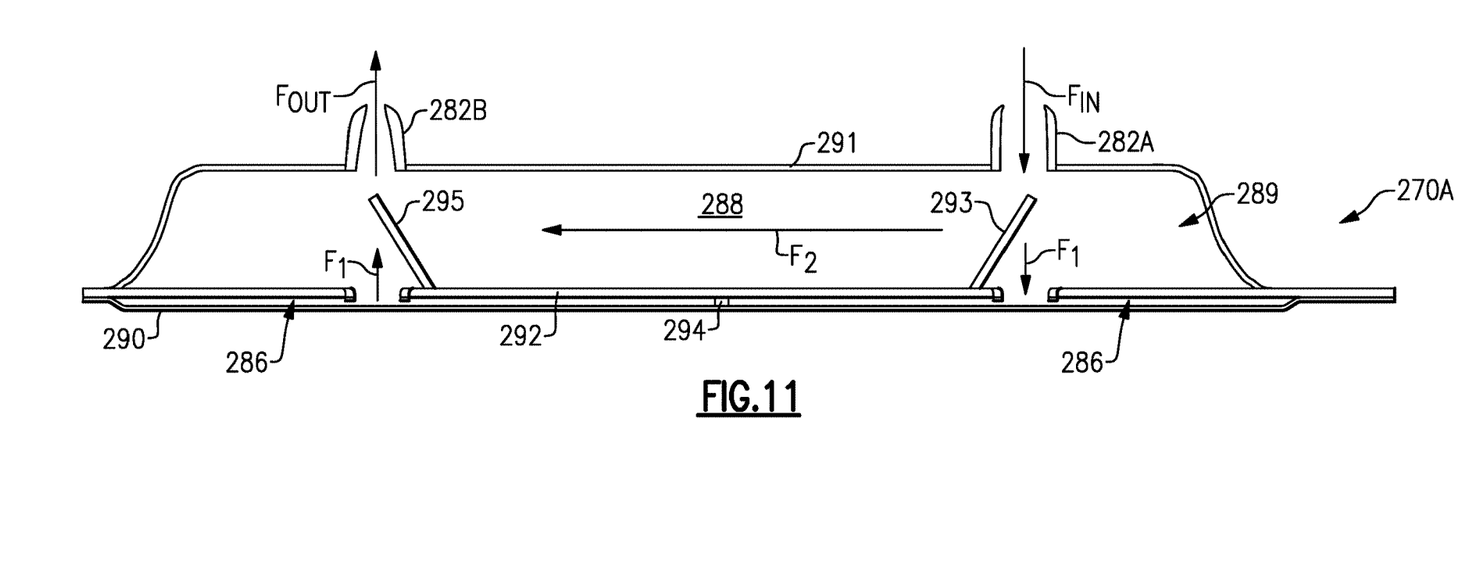
FIG. 11 is a cross-sectional view illustrating an example thermal exchange plate assembly with a bypass channel defined within a bypass plenum.

FIG. 11 illustrates another embodiment of the thermal exchange plate assembly. FIG. 11 illustrates a first thermal exchange plate assembly 270A. To the extent not otherwise described or shown, the first thermal exchange plate assembly 270A corresponds to the first thermal exchange plate assembly 70A of FIGS. 3-4, with like parts having reference numerals preappended with a "2."

In FIG. 11, the first thermal exchange plate assembly 270A includes a main channel 286 bounded by a base plate 290 and a cover plate 292. Similar to the wall 94 (FIGS. 3-4), the main channel 286 is partially divided by a wall 294. Between the cover plate 292 and the inlet and outlet ports 282A, 284A, the first thermal exchange plate assembly 270A includes a bypass channel 288 defined within a bypass plenum 289. The bypass plenum 289 is provided between a bypass housing 291 and the cover plate 292. Within the bypass plenum 289, the first thermal exchange plate assembly 270A includes first and second deflectors 293, 295.

The first and second deflectors 293, 295 split a flow $F_{IN}$ from the inlet port 282A into a main flow $F_1$ and a bypass flow $F_2$ in substantially the same way as the deflectors 102, 102', 102'', and 102'''. The first and second deflectors 293, 295 are, in this example, provided at a fixed angle relative to the cover plate 292. In another example, an angle of the first and second deflectors 293, 295 may be adjustable by an actuator, to adjust the amount of bypass flow $F_2$ directed to the bypass channel 288.

While not specifically mentioned above, it should be understood that the components of the first and second thermal exchange plate assemblies 70A, 70B, 270A, 270B could be made of any suitable material. In one example, the assemblies, including the deflectors 102, 102', 102'', 102''', 293, 295, may be made of aluminum. Further, the assemblies could be made of extruded, molded, or stamped parts that are welded together. However, other manufacturing techniques are also contemplated.

It should be understood that terms such as "axial," "radial," and the like are used above with reference to the normal operational orientation of a vehicle. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A battery assembly, comprising:
an array of battery cells;
a thermal exchange plate assembly adjacent the array and including an inlet, an outlet, a main channel, and a bypass channel configured to direct fluid from the inlet to the outlet while substantially bypassing the main channel and without exchanging substantial heat with the array of battery cells;
a deflector configured to direct fluid into the bypass channel, wherein the deflector has a rim and a base defining a concave surface facing the inlet; and
wherein the main channel includes a wall, a delivery side on a first side of the wall, a return side on a second side of the wall, and a turning section between the delivery side and the return side,
wherein the deflector is configured to direct fluid from the first side of the wall to the second side of the wall,
wherein a first end of the deflector is adjacent the inlet, and a second end of the deflector extends to the wall but does not extend beyond the wall.

2. The battery assembly as recited in claim 1, wherein at the first end of the deflector the rim is aligned with a longitudinal axis of the inlet, and the second end of the deflector is substantially U-shaped in cross-section.

3. The battery assembly as recited in claim 2, wherein a length of the deflector is substantially perpendicular to the longitudinal axes of the inlet and outlet.

4. The battery assembly as recited in claim 1, wherein the bypass channel is defined within a bypass plenum.

5. The battery assembly as recited in claim 1, wherein the deflector defines a boundary of the bypass channel.

6. The battery assembly as recited in claim 1, wherein the base of the deflector defines a bottom of the bypass channel.

7. The battery assembly as recited in claim 1, wherein the deflector projects partially into the main channel.

8. The battery assembly as recited in claim 1, wherein a position of the deflector is fixed relative to the wall.

9. The battery assembly as recited in claim 1, wherein the deflector is configured to split fluid exiting the inlet.

10. The battery assembly as recited in claim 1, wherein an end of the rim of the deflector is aligned with a longitudinal axis of the inlet.

11. The battery assembly as recited in claim 1, wherein fluid exiting the bypass channel enters the return side of the main channel before entering the outlet.

12. The battery assembly as recited in claim 1, wherein the inlet is provided by an inlet port and the outlet is provided by an outlet port, and the deflector is beneath a bottom-most end of the inlet port and a bottom-most end of the outlet port.

13. The battery assembly as recited in claim 1, wherein the deflector is arranged below the inlet and is configured to turn some of the fluid exiting the inlet substantially 90° toward the outlet.

14. A battery assembly, comprising:
a first thermal exchange plate assembly including an inlet, an outlet, a main channel, and a bypass channel configured to direct fluid to the outlet of the first thermal exchange plate assembly while substantially bypassing the main channel and without exchanging substantial heat with an array of battery cells; and
a second thermal exchange plate assembly including an inlet fluidly coupled to the outlet of the first thermal exchange plate assembly,
wherein the first thermal exchange plate assembly further comprises a deflector configured to direct fluid into the bypass channel,
wherein the deflector has a rim and a base defining a concave surface facing the inlet of the first thermal exchange plate assembly,
wherein the main channel includes a wall, a delivery side on a first side of the wall, a return side on a second side of the wall, and a turning section between the delivery side and the return side; and
wherein the deflector is configured to direct fluid from the first side of the wall to the second side of the wall,
wherein a first end of the deflector is adjacent the inlet, and a second end of the deflector extends to the wall but does not extend beyond the wall.

\* \* \* \* \*